(12) United States Patent
Barbu et al.

(10) Patent No.: US 12,513,654 B2
(45) Date of Patent: Dec. 30, 2025

(54) POSITION ESTIMATION

(71) Applicant: NOKIA TECHNOLOGIES OY, Espoo (FI)

(72) Inventors: Oana-Elena Barbu, Aalborg (DK); Johannes Harrebek, Aalborg (DK); Benny Vejlgaard, Gistrup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 357 days.

(21) Appl. No.: 17/917,378

(22) PCT Filed: Apr. 6, 2020

(86) PCT No.: PCT/EP2020/059786
§ 371 (c)(1),
(2) Date: Oct. 6, 2022

(87) PCT Pub. No.: WO2021/204351
PCT Pub. Date: Oct. 14, 2021

(65) Prior Publication Data
US 2023/0156658 A1    May 18, 2023

(51) Int. Cl.
*H04W 64/00* (2009.01)
*G01S 5/02* (2010.01)

(52) U.S. Cl.
CPC ......... *H04W 64/003* (2013.01); *G01S 5/0218* (2020.05)

(58) Field of Classification Search
CPC ............................ H04W 64/00; H04W 64/003
(Continued)

(56) References Cited

U.S. PATENT DOCUMENTS 8,378,891 B2 * 2/2013 Murray .................. G01S 19/46
342/450
2011/0199255 A1 * 8/2011 Murray .................. G01S 5/021
342/451
(Continued)

FOREIGN PATENT DOCUMENTS

CN          1643396 A      7/2005
CN        102143578 A      8/2011
(Continued)

OTHER PUBLICATIONS

Office Action dated Oct. 10, 2023, corresponding to Japanese Patent Application No. 2022-561034.
(Continued)

*Primary Examiner* — Joseph Arevalo
(74) *Attorney, Agent, or Firm* — SQUIRE PATTON BOGGS (US) LLP

(57) ABSTRACT

An apparatus comprising at least one processor; and at least one memory including computer program code; the at least one memory and the computer program code configured to, with the at least one processor, cause the apparatus to perform: determining, for a terminal node, at least one time delay value for a plurality of access nodes; determining at least one metric for the access nodes, the at least one metric indicative of probability of line of sight conditions between the terminal node and the access nodes; determining, based, at least in part, on the at least one metric, a first set of line of sight time delay values having an associated probability of line of sight conditions above a threshold; determining, based, at least in part, on the at least one metric, a second set of time delay values having an associated probability of line of sight conditions below the threshold; determining a position estimate of the terminal node based, at least in part, on the first set of line of sight time delay values; determining, based at least in part on the position estimate of the
(Continued)

terminal node, at least one line of sight time delay value of the second set; and determining a new estimate of the position of the terminal node based, at least in part, on the at least one determined line of sight time delay value of the second set.

15 Claims, 6 Drawing Sheets

(58) Field of Classification Search
USPC ...... 455/456.3, 103, 456.1, 456.6, 441, 458, 455/404.2, 436
See application file for complete search history.

(56) References Cited

U.S. PATENT DOCUMENTS

| | | | | |
|---|---|---|---|---|
| 2012/0158981 | A1* | 6/2012 | Desai | H04L 67/1046 709/230 |
| 2016/0236576 | A1* | 8/2016 | Hika | B60L 53/36 |
| 2020/0153701 | A1* | 5/2020 | Mohan | H04L 41/5009 |

FOREIGN PATENT DOCUMENTS

| | | |
|---|---|---|
| CN | 104467990 A | 3/2015 |
| CN | 104885538 A | 9/2015 |
| EP | 1 469 685 A1 | 10/2004 |
| EP | 1 793 643 A2 | 6/2007 |
| JP | H0837471 A | 2/1996 |
| JP | 2006023267 A | 1/2006 |
| JP | 2008267973 A | 11/2008 |
| JP | 2012-173070 A | 9/2012 |
| JP | 2013-068451 A | 4/2013 |
| JP | 2015-158492 A | 9/2015 |
| JP | 2016510401 A | 4/2016 |
| JP | 2017-152978 A | 8/2017 |
| JP | 2017181276 A | 10/2017 |

OTHER PUBLICATIONS

International Search Report and Written Opinion dated Dec. 7, 2020 corresponding to International Patent Application No. PCT/EP2020/059786.
Notice of Reasons for Refusal dated Mar. 28, 2024 corresponding to Japanese Patent Application No. 2022-561034, with English translation thereof.
Decision to Grant a Patent dated Sep. 26, 2024 corresponding to Japanese Patent Application No. 2022-561034, with English translation thereof.
Communication Pursuant to Article 94(3) EPC dated Oct. 15, 2024, corresponding to European Patent Application No. 20 718 611.5.
Notification of the First Office Action dated Oct. 25, 2024 corresponding to Chinese Patent Application No. 2020801017821, with English translation thereof.
Carlo Morelli et al., "Hidden Markov Models for Radio Localization in Mixed LOS/NLOS Conditions," IEEE Transactions on Signal Processing, vol. 55, No. 4, Apr. 2007.
Research on TOA Wireless Location Algorithm Based on NLOS error Identification and Mitigation, Beijing Jiaotong University, May 2019.

* cited by examiner

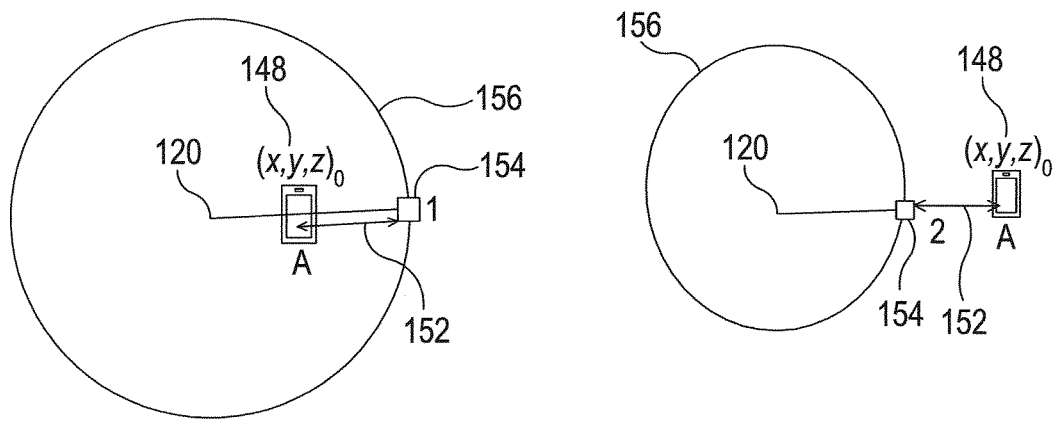
FIG. 6
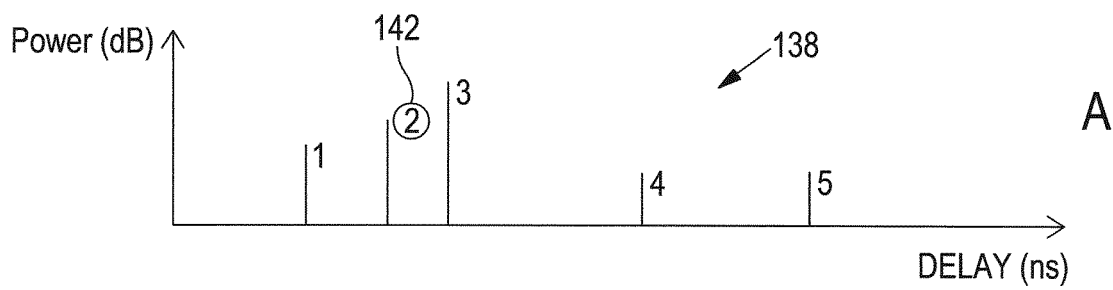
FIG. 7
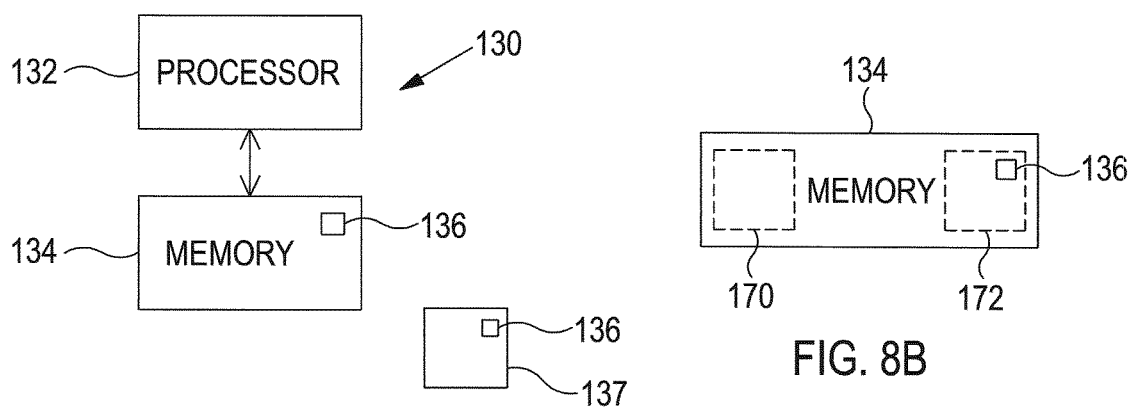
FIG. 8A
FIG. 8B

POSITION ESTIMATION

TECHNOLOGICAL FIELD

Embodiments of the present disclosure relate to position estimation. Some relate to position estimation of a terminal node using multipath information.

BACKGROUND

A wireless network comprises a plurality of network nodes including terminal nodes and access nodes. Communication between the terminal nodes and access nodes is wireless.

In some circumstances it may be desirable to improve accuracy in estimating positions of the terminal nodes.

BRIEF SUMMARY

According to various, but not necessarily all, embodiments there is provided examples as claimed in the appended claims.

According to various, but not necessarily all, embodiment there is provided an apparatus comprising
  at least one processor; and
  at least one memory including computer program code;
  the at least one memory and the computer program code configured to, with the at least one processor, cause the apparatus to perform:
  determining, for a terminal node, at least one time delay value for a plurality of access nodes;
  determining at least one metric for the access nodes, the at least one metric indicative of probability of line of sight conditions between the terminal node and the access nodes;
  determining, based, at least in part, on the at least one metric, a first set of line of sight time delay values having an associated probability of line of sight conditions above a threshold;
  determining, based, at least in part, on the at least one metric, a second set of time delay values having an associated probability of line of sight conditions below the threshold;
  determining a position estimate of the terminal node based, at least in part, on the first set of line of sight time delay values;
  determining, based at least in part on the position estimate of the terminal node, at least one line of sight time delay value of the second set; and
  determining a new estimate of the position of the terminal node based, at least in part, on the at least one determined line of sight time delay value of the second set.

In examples determining the at least one time delay value for a plurality of access nodes comprises determining a plurality of time delay values for one or more of the plurality of access nodes.

In examples the at least one metric is determined based, at least in part, on one or more power delay profile metrics determined based, at least in part, on the at least one time delay value for the plurality of access nodes.

In examples the one or more power delay profile metrics comprises one or more of: mean excess delay, root mean square delay spread, a list of time delay values that are less than a determined line of sight time delay value for an access node and within a predetermined amount from the highest or maximum received power for that access node, and the number of multipath components above a predetermined power.

In examples determining the at least one metric comprises determining the at least one metric based, at least in part, on historical line of sight information of at least one of the access nodes.

In examples determining a first set of line of sight time delay values having an associated probability of line of sight conditions above a threshold comprises comparing the at least one metric to at least one threshold value.

In examples determining a position estimate of the terminal node comprises using an observed time difference of arrival method based, at least in part, on the first set of line of sight time delay values.

In examples determining at least one line of sight time delay value of the second set comprises comparing distances from the access nodes represented by one or more time delay values of the second set with the position estimate of the terminal node.

In examples comparing distances from the access nodes represented by time delay values of the second set with the position estimate of the terminal node comprises determining a distance between the position estimate of the terminal node and a colinear point on a circle or hyperbola described by one or more of the time delay values of the second set.

In examples determining a new estimate of the position of the terminal node comprises updating the position estimate of the terminal node based, at least in part, on the at least one determined line of sight time delay value of the second set.

In examples the at least one memory and the computer program code are configured to, with the at least one processor, cause the apparatus to store, at least, the at least one metric for the plurality of access nodes and a position of the terminal node.

In examples the at least one memory and the computer program code are configured to, with the at least one processor, cause the apparatus to determine positions of the plurality of access nodes.

In examples determining, for a terminal node, at least one time delay value for a plurality of access nodes comprises receiving one or more signals from the plurality of access nodes.

In examples, determining, for a terminal node, at least one time delay value for a plurality of access nodes comprises receiving one or more signals from the terminal node.

In examples the terminal node is user equipment and the access nodes are gNBs.

According to various, but not necessarily all, embodiments there is provided user equipment comprising an apparatus as described herein.

According to various, but not necessarily all, embodiments, there is provided a server comprising an apparatus as described herein.

According to various, but not necessarily all, embodiments there is provided a method comprising:
  determining, for a terminal node, at least one time delay value for a plurality of access nodes;
  determining at least one metric for the access nodes, the at least one metric indicative of probability of line of sight conditions between the terminal node and the access nodes;
  determining, based, at least in part, on the at least one metric, a first set of line of sight time delay values having an associated probability of line of sight conditions above a threshold;

determining, based, at least in part, on the at least one metric, a second set of time delay values having an associated probability of line of sight conditions below the threshold;

determining a position estimate of the terminal node based, at least in part, on the first set of line of sight time delay values;

determining, based at least in part on the position estimate of the terminal node, at least one line of sight time delay value of the second set; and determining a new estimate of the position of the terminal node based, at least in part, on the at least one determined line of sight time delay value of the second set.

According to various, but not necessarily all, embodiments there is provided an apparatus comprising means for performing:

determining, for a terminal node, at least one time delay value for a plurality of access nodes;

determining at least one metric for the access nodes, the at least one metric indicative of probability of line of sight conditions between the terminal node and the access nodes;

determining, based, at least in part, on the at least one metric, a first set of line of sight time delay values having an associated probability of line of sight conditions above a threshold;

determining, based, at least in part, on the at least one metric, a second set of time delay values having an associated probability of line of sight conditions below the threshold;

determining a position estimate of the terminal node based, at least in part, on the first set of line of sight time delay values;

determining, based at least in part on the position estimate of the terminal node, at least one line of sight time delay value of the second set; and determining a new estimate of the position of the terminal node based, at least in part, on the at least one determined line of sight time delay value of the second set.

According to various, but not necessarily all, embodiments there is provided a computer program comprising instructions for causing an apparatus to perform at least the following or for performing at least the following:

determining, for a terminal node, at least one time delay value for a plurality of access nodes;

determining at least one metric for the access nodes, the at least one metric indicative of probability of line of sight conditions between the terminal node and the access nodes;

determining, based, at least in part, on the at least one metric, a first set of line of sight time delay values having an associated probability of line of sight conditions above a threshold;

determining, based, at least in part, on the at least one metric, a second set of time delay values having an associated probability of line of sight conditions below the threshold;

determining a position estimate of the terminal node based, at least in part, on the first set of line of sight time delay values;

determining, based at least in part on the position estimate of the terminal node, at least one line of sight time delay value of the second set; and determining a new estimate of the position of the terminal node based, at least in part, on the at least one determined line of sight time delay value of the second set.

According to various, but not necessarily all, embodiments there is provided an apparatus comprising
at least one processor; and
at least one memory including computer program code;
the at least one memory and the computer program code configured to, with the at least one processor, cause the apparatus to perform:
transmitting at least one signal to a terminal node, the at least one signal comprising information indicative of a request for the terminal node to respond with, at least, one or more power delay profile metrics for access nodes contactable by the terminal node and at least one metric indicative of probability of line of sight conditions between the terminal node and the access nodes.

In examples the one or more power delay profile metrics comprises at least one of: mean excess delay, root mean square delay spread, a list of time delay values that are less than a determined line of sight time delay value for an access node and within a predetermined amount from the highest or maximum received power for that access node, and the number of multipath components above a predetermined power.

According to various, but not necessarily all, embodiments there is provided an apparatus comprising
at least one processor; and
at least one memory including computer program code;
the at least one memory and the computer program code configured to, with the at least one processor, cause the apparatus to perform:
transmitting, from a terminal node, at least one signal to a server, the at least one signal comprising information indicative of one or more power delay profile metrics for access nodes contactable by the terminal node and at least one metric indicative of probability of line of sight conditions between the terminal node and the access nodes.

In examples the one or more power delay profile metrics comprises at least one of: mean excess delay, root mean square delay spread, a list of time delay values that are less than a determined line of sight time delay value for an access node and within a predetermined amount from the highest or maximum received power for that access node, and the number of multipath components above a predetermined power.

BRIEF DESCRIPTION

Some examples will now be described with reference to the accompanying drawings in which:

FIG. 6 shows another example of the subject matter described herein;

FIG. 7 shows another example of the subject matter described herein;

FIG. 8A shows another example of the subject matter described herein;

FIG. 8B shows another example of the subject matter described herein.

DETAILED DESCRIPTION

Figure 1:
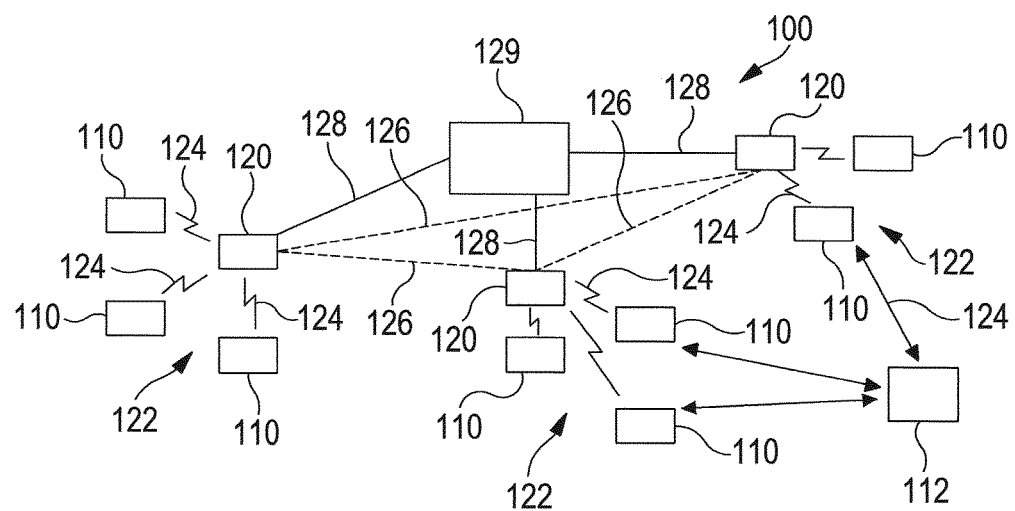
FIG. 1 shows an example of the subject matter described herein.

FIG. 1 illustrates an example of a network 100 comprising a plurality of network nodes including terminal nodes 110, access nodes 120 and one or more core nodes 129. The terminal nodes 110 and access nodes 120 communicate with each other. The one or more core nodes 129 communicate with the access nodes 120.

The one or more core nodes 129 may, in some examples, communicate with each other. The one or more access nodes 120 may, in some examples, communicate with each other.

The network 100 may be a cellular network comprising a plurality of cells 122 at least one served by an access node 120. In this example, the interface between the terminal nodes 110 and an access node 120 defining a cell 122 is a wireless interface 124.

The access node 120 is a cellular radio transceiver. The terminal nodes 110 are cellular radio transceivers.

In the example illustrated the cellular network 100 is a third generation Partnership Project (3GPP) network in which the terminal nodes 110 are user equipment (UE) and the access nodes 120 are base stations.

In some examples the network 100 is an Evolved Universal Terrestrial Radio Access network (E-UTRAN). The E-UTRAN consists of E-UTRAN NodeBs (eNBs) 120, providing the E-UTRA user plane and control plane (RRC) protocol terminations towards the UE 110. The eNBs 120 are interconnected with each other by means of an X2 interface 126. The eNBs are also connected by means of the S1 interface 128 to the Mobility Management Entity (MME) 129.

In some examples the network 100 is a Next Generation (or New Radio, NR) Radio Access network (NG-RAN). The NG-RAN consists of gNodeBs (gNBs) 120, providing the user plane and control plane (RRC) protocol terminations towards the UE 110. The gNBs 120 are interconnected with each other by means of an X2/Xn interface 126. The gNBs are also connected by means of the N2 interface 128 to the Access and Mobility management Function (AMF).

In examples the network 100 comprises at least one server 112. In the illustrated example the server 112 is a location server 112.

In examples one or more of the terminal nodes 110 can communicate with the location server 112 and one or more signals 162, 163, comprising information, (see, for example, FIGS. 3 and 4) can be transmitted directly, or indirectly, between one or more of the terminal nodes 110 and the location server 112.

In the illustrated example, the interface between a plurality of the terminal nodes 110 and the location server 112 is a wireless interface 124, however any suitable interface can be used.

In examples, communications between the elements illustrated in FIG. 1 can proceed via any number of intervening elements, including no intervening elements.

Figure 2:
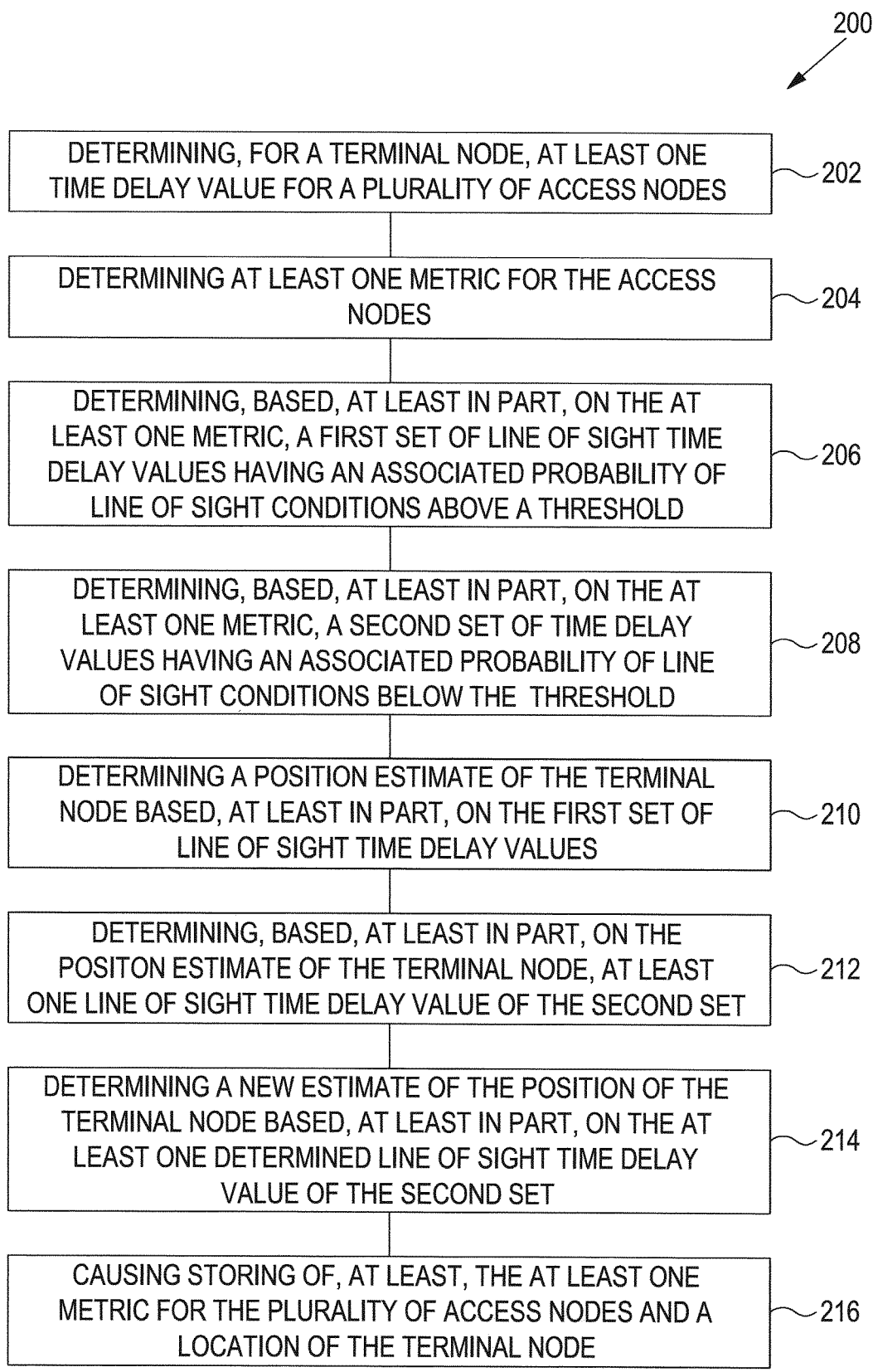
FIG. 2 shows another example of the subject matter described herein.

FIG. 2 illustrates an example of a method 200.

In examples the method 200 can be performed at one or more of the elements in the network 100 of FIG. 1. For example, the method 200 can be performed at an access node 110, such as a UE 164, and/or a server 112, such as a location server 112.

One or more of the features discussed in relation to FIG. 2 can be found in one or more of the other figures.

At block 202, the method 200 comprises determining, for a terminal node 110, at least one time delay value 138 for a plurality of access nodes 120.

Any suitable method for determining, for a terminal node 110, at least one time delay value 138 for a plurality of access nodes 120 can be used.

As used herein, the term "determining" (and grammatical variants thereof) can include, not least: calculating, computing, processing, deriving, investigating, looking up (for example, looking up in a table, a database or another data structure), ascertaining and the like. Also, "determining" can include receiving (for example, receiving information), accessing (for example, accessing data in a memory) and the like. Also, "determining" can include resolving, selecting, choosing, establishing, and the like.

As used herein, a time delay value 138 is intended to include any measurement, metric, value, parameter and/or quantity indicative of and/or representing and/or quantifying time taken for one or more signals to travel from an access node 120 to a terminal node 110. In some examples, a time delay value 138 can be considered a delay.

Under line of sight conditions between an access node 120 and a terminal node 110, a time delay value 138 can be used to determine a distance between the access node 120 and the terminal node 110.

Under line of sight conditions between an access node 120 and a terminal node 110, a time delay value 138 for line of sight conditions can be considered a line of sight time delay value 142 or time of arrival.

The at least one time delay value 138 for the plurality of access nodes 120 can have any suitable form. In examples the time delay values 138 can be in the form of absolute timings and/or relative timings.

For example, the at least one time delay value for the access nodes 120 can be in the form of a delay between transmission from the access nodes 120 and reception by the terminal node 110.

In some examples the at least one time delay value 138 for the plurality of access nodes 120 can be in the form of a delay for a reference or anchor access node 120 and time differences relative to the reference or anchor access node 120 delay.

In examples the access nodes 120 transmit time synchronized positioning reference signals with constant power which are received by a terminal node 110, via at least one path, and allow the terminal node 110 to determine or be caused or controlled to determine time delay value(s) 138 for received signals from the access nodes 120. In some examples the terminal node 110 determines or is caused or controlled to determine reference signal time differences relative to a time delay value 138 of an anchor access node 120.

In examples, any suitable method can be used to determine at least one time delay value 138 for received signals from the access nodes 120. For example, channel impulse response or correlation-based methods can be used to determine time delay values 138 and associated power for signals received from the access nodes 120.

In some examples, the determining at least one time delay value 138 for received signals from the access nodes 120 comprises cross-correlating the received signals with locally generated positioning reference signals and distinguishing N different channels, corresponding to N access nodes 120.

Accordingly, in examples, determining, for a terminal node 110, at least one time delay value 138 for a plurality of access nodes 120 comprises receiving one or more signals from the plurality of access nodes 120.

In some examples determining the at least one time delay value 138 for a plurality of access nodes 120 comprises determining a plurality of time delay values 138 for one or more of the plurality of access nodes 120.

In examples, determining a plurality of time delay values 138 for an access node 120 can be considered determining multipath time delay information for the access node 120.

Signal(s), such as positioning reference signals, transmitted by an access node 120 can reach the terminal node 110 via multiple paths, including line of sight (LOS) and/or non line of sight (NLOS) paths.

In such examples, the terminal node 110 can determine a plurality of different time delay values 138 for an access node 120 as a result of the multipath arrival of the signals.

In examples, the method 200 comprises determining an LOS time delay value 142 for the access nodes 120 which could be considered as time of arrival for signals received from the access nodes and used in determining a position/location of the terminal node 110.

In some examples determining an LOS time delay value 142 for an access node 120 comprises determining which of a plurality of time delay values 138 for the terminal node is or is to be considered the LOS time delay value 142.

Determining the LOS time delay value from a plurality of time delay values 138 can be done in any suitable way, using any suitable method considering any suitable factor or factors.

For example, the LOS time delay value 142 can, at least initially, be considered to be the time delay value 138, of a plurality of time delay values 138, having the highest associated power.

However, in certain contexts power of LOS signals can be attenuated compared to NLOS signals resulting in an incorrect identification of the LOS time delay value 142 which can cause errors in determining a position/location of at terminal node 110.

Accordingly, as used herein a line of sight (LOS) time delay value 142 can be considered to be the time delay value 138 having a high, and/or the highest confidence level and/or probability of being from line of sight conditions between an access node 120 and the terminal node 110.

In some examples an LOS time delay value 142 can be considered to be the time delay value 138 currently considered to be the LOS time delay value 142 based on the available information and/or the factor(s) considered in determining the LOS time delay value 142.

In examples determining, for a terminal node 110, at least one time delay value 138 for a plurality of access nodes 120 comprises receiving one or more signals 162 from the terminal node 110.

The one or more signals 162 can also comprise additional information for use in determining a position/location of the terminal node 110. For example, the one or more signals 162 can comprise one or more time delay values 138 and one or more metrics and/or measurements. In some examples the one or more metrics and/or measurements can comprise one or more power delay profile metrics. See, for example, block 204.

In examples, the one or more signals 162 are received at a location server 112. See, for example, FIG. 3

At block 204 the method 200 comprises determining at least one metric 140 for the access nodes 120, the at least one metric 140 indicative of probability of line of sight conditions between the terminal node 110 and the access nodes 120.

In examples, the at least one metric 140 can be considered to be indicative of a level of confidence of line of sight conditions between the terminal node 110 and the access nodes 120.

In examples, the at least one metric 140 is or can be considered to be an estimate and/or determination and/or measurement of the probability or confidence that an LOS time delay value 142 for an access node 120 has been received under line of sight conditions.

Additionally, or alternatively, in examples, the at least one metric 140 is or can be considered to be an estimate and/or determination and/or measurement of the probability or confidence that an LOS time delay value 142 for an access node 120 has been correctly identified.

Any suitable method for determining the at least one metric 140 can be used. In examples, determining the at least one metric 140 comprises processing and/or analyzing multipath information.

In some examples the at least one metric 140 is determined based, at least in part, on one or more power delay profile metrics determined, based, at least in part, on the at least one time delay value 138 for the plurality of access nodes 120.

A power delay profile (PDP) can be considered to represent the intensity or power of a signal received through a multipath channel as a function of time delay.

Accordingly, in examples, the power delay profile for the plurality of access nodes 120 can represent the intensity or power of the signals received as a function of the at least one time delay value 138 for the access nodes. See, for example, FIG. 5.

Any suitable power delay profile metric can be used. For example, the at least one power delay profile metric can be determined based, at least in part, on one or more of the energy in the channel, the spread of the time delay value(s) 138, the power associated with the time delay value(s) 138, the number of time delay values 138 and so on.

In some examples, the one or more power delay profile metrics comprises one or more of: mean excess delay, root mean square delay spread, a list of time delay values 138 that are less than a determined line of sight time delay value 142 for an access node 120 and within a predetermined amount from the highest or maximum received power for that access node 120, and the number of multipath components above a predetermined power.

The mean excess delay (MED) can be considered to be the time delay during which the energy in the channel falls to a predetermined amount below the highest or maximum power.

In examples, any suitable predetermined amount below the highest or maximum power can be used. For example, a predetermined amount in the range 7.5 dB to 12.5 dB can be used.

In examples, the predetermined amount is substantially 10 dB and therefore, in such examples, the MED is the time delay during which the energy in the channel falls to 10 dB below the highest or maximum.

A small MED value is an indication of line of sight conditions. In examples, an MED value in the order of tens of nanoseconds is considered a small MED value. In some examples, an MED value in the range 10 to 100 nanoseconds can be considered a small MED value. In some examples, an MED value in the range 30 to 70 nanoseconds can be considered a small MED value.

The root mean square delay spread (RMS-DS) can be considered to be the square root of the second central moment of the power delay profile.

A small RMS-DS value is an indication of line of sight conditions. In examples, an RMS-DS value in the order of tens of nanoseconds is considered a small RMS-DS value. In some examples, an RMS-DS value in the range 10 to 100 nanoseconds can be considered a small RMS-DS value. In some examples, an RMS-DS value in the range 30 to 70 nanoseconds can be considered a small RMS-DS value.

With regard to the list of time delay values 138 that are less than a determined line of sight time delay value 142 for an access node 120 and within a predetermined amount from the highest or maximum received power for that access node 120, any suitable predetermined amount can be used. In examples the list can be represented by Lc.

For example, a predetermined amount in the range 2 to 4 dB can be used.

In examples, the predetermined amount is substantially 3 dB and in such examples the list is of time delay values 138 that are less than a determined line of sight time delay value 42 for an access node 120 and within 3 dB from the highest or maximum received power for that access node 120.

The list of time delay values 138 can be beneficial in removing the error introduced when the true LOS time delay value 142 is attenuated compared to a NLOS time delay value 138 and is not correctly identified as the LOS time delay value 142.

With regard to the number of multipath components above a predetermined power, this can be considered 'channel sparsity'.

In examples, any suitable predetermined power value can be used. For example, the number of multipath components of non-negligible power can be determined. In some examples, the noise floor can be used in determining channel sparsity and, in such examples, the number of multipath components above the noise floor is determined.

Channel sparsity can be beneficial in determining whether line of sight conditions are present. In examples, channel sparsity can be used in combination with one or more other power delay profile metrics in determining whether a channel is LOS or NLOS.

In examples, one or more power delay profile metrics can be used in any suitable way to determine the at least one metric 140.

In examples, the at least one metric 140 can be a single metric, represented by $P_{LOS}$ for example, defined as a step function based on at least one or more power delay profile metrics. In some examples, the metric 140, $P_{LOS}$, can be defined as a step function based on mean excess delay, root mean square delay spread and channel sparsity.

In some examples, $P_{LOS}$ can be defined as a step function based on a comparison of MED, RMS-DS and channel sparsity against respective thresholds.

For example, $P_{LOS}$ can be defined as:

$$p_{LOS} = \begin{cases} 1, & \text{if } MED < \eta_{MED} \text{ and } RMS < \eta_{RMS} \text{ and Channel sparsity} < \eta_k \\ 0, & \text{otherwise} \end{cases} \quad \text{Eqn 1}$$

Where:
$\eta_{MED}$, $\eta_{RMS}$ and $\eta_K$ are threshold values for MED, RMS-DS and channel sparsity respectively.

In examples any suitable threshold values can be used. For example, $\eta_{MED}$ can be in the range 250 ns to 750 ns, can be in the range 400 ns to 600 ns and/or can be in the range 450 ns to 550 ns. In some examples, $\eta_{MED}$ can be or can be approximately 500 ns.

In some examples, $\eta_{RMS}$ can be in the range 0.5 to 1.5 μs, can be in the range 0.75 to 1.25 μs, and/or can be in the range 0.9 to 1.1 μs. In some examples, ARMS can be or can be approximately 1 μs.

In some examples, $\eta_K$ can be in the range 5 to 15, can be in the range 7 to 13 and/or can be in the range 9 to 11. In some examples, $\eta_K$ can be or can be approximately 10.

In some examples the at least one metric 140 can be determined as a LOS probability. For example, $P_{LOS}$ can represent the probability of LOS conditions on channel and can be determined based, at least in part on one or more power delay profile metrics.

In some examples, one or more power delay profile metrics, for example one or more of MED, RMS-DS, Lc and channel sparsity, can be used as inputs to a machine learning module which is configured to output the at least one metric 140.

Any suitable machine learning module can be used. For example, one or more artificial neural networks and/or support vector machines.

In examples, the machine learning module can be implemented by means of supervised learning, for example as an artificial neural network regressor, or classifier, or with algorithms from the reinforcement learning framework.

In examples, a neural network can implement several hidden layers, which can be characterized by various activation functions such a s ReLU, linear, tanh and so on.

In examples the machine learning module is trained on artificially generated channels, for example from ray tracing, and can be used once the false positive rate for LOS condition detection is minimized.

In examples, a neural network can be trained on a set of measurements collected in a controlled environment, for example with known LOS/NLOS conditions.

The loss function can be cross-entropy, hinge and so on.

In some examples, in a machine learning framework, a neural network with an output activation function such as softmax, sigmoid function, or similar can be used.

In some examples determining the at least one metric 140 comprises hypothesis testing. For example, one or more power delay profile metrics can be tested to determine whether they are drawn from distributions characterizing LOS or NLOS conditions.

In examples an optimization problem is formulated and Bayesian inference methods used, for example, to determine probabilities of the at least one metric 140.

In examples determining the at least one metric 140 comprises determining the at least one metric 140, based at least in part, on historical line of sight information of at least one of the access nodes 120.

Any suitable method for determining the at least one metric 140, based at least in part, on historical line of sight information of at least one of the access nodes 120 can be used.

In examples, the at least one metric 140 is determined based, at least in part, on previously determined or estimated channels substantially at and/or in the vicinity of and/or proximate and/or nearby a current position/location of the terminal node 110 and/or an area where the terminal node 110 is currently located.

For example, the at least one metric 140 can be determined based, at least in part, on previously determined values of the at least one metric 140 for the access nodes 120.

In some examples, the at least one metric 140 is determined based, at least in part, on historical information of one or more other terminal nodes 110.

For example, the at least one metric 140 can be determined based, at least in part, on previously determined values of the at least one metric 140 determined for at least one or more other terminal nodes 110 at and/or proximate and/or nearby a current position/location of the terminal node 110 for the access nodes 120 from which the terminal node 110 has received one or more signals.

In examples, previously determined values of the at least one metric 140 determined for at least one or more other terminal nodes 110 within substantially or approximately 10 m of a current position/location of the terminal node 110 can be used.

In examples, the current position/location of the terminal node 110 can be estimated based, at least in part, on information of the terminal node's past position(s)/location(s) and an estimated velocity. In some examples this process can be referred to as dead reckoning.

Such an estimate of the position/location of a terminal node 110 can be used with historical information in the determination of the at least one metric 140.

In examples, the at least one metric 140 for the access nodes 120 is stored or caused to be stored in at least one data structure, for example at least one table, which can be considered a tracking data structure or tracking table.

In some examples, one or more of the one or more power delay profile metrics for the access nodes are also stored in the at least one data structure.

For example, when the method 200 is performed at a terminal node 110, the determined at least one metric 140 and, in some examples, the at least one power delay profile metrics for the access nodes are stored or caused to be stored in a tracking data structure, such as a tracking table, with an associated time stamp.

In examples, the information in the at least one tracking data structure can be considered to trace or track the channels from the access nodes 120.

The tracking data structure can be implemented as a first-in first-out (FIFO) tracking data structure and/or tracking table. For example, the data structure can be implemented as a FIFO queue, with at most K entries, where the most recent K measurements are stored.

In examples, K can be fixed or variable. In some examples K can be proportional to the capabilities, such as speed, of the terminal node 110.

Examples of a tracking data structure, in the form of a tracking table, for two access nodes 120 is shown in table 1. In the example of table 1, the access nodes 120 are gNBs.

Furthermore, in the example of table 1, the determined LOS time delay values 142 are indicated as 'ToA'.

TABLE 1

| timestamp | ToA | MED | RMS-DS | Lc | Chan. Sparse | P_LOS |
|---|---|---|---|---|---|---|
| gNB 1 | | | | | | |
| T2 | 500 ns | 8\mus | 1\mus | {40 ns} | 5 | 0 |
| T1 | 550 ns | 14\mus | 1\mus | {10 ns} | 7 | 0 |
| gNB 2 | | | | | | |
| T2 | 900 ns | 7\mus | 3\mus | {400, 700 ns} | 5 | 0 |
| T1 | 1500 ns | 8\mus | 3\mus | {400, 800 ns} | 7 | 0 |

In the example of table 1, the LOS time delay value 142, or ToA, at least one metric, $P_{LOS}$, and power delay profile metrics MED, RMS-DS, Lc and channel sparsity at two different timestamps have been stored.

In examples, at least a portion of the information determined at a timestamp is transmitted or caused to be transmitted from the terminal node 110 to a location server 112. See for example, FIG. 3.

At block 206 the method 200 comprises determining, based, at least in part, on the at least one metric 140, a first set 144 of line of sight time delay values 142 having an associated probability of line of sight conditions above a threshold.

In examples an associated probability can be or be considered an associated confidence and/or confidence level of line of sight conditions.

Any suitable method for determining, based, at least in part, on the at least one metric 140, a first set 144 of line of sight time delay values 142 having an associated probability of line of sight conditions above a threshold can be used.

Determining a first set 144 of line of sight time delay values 142 having an associated probability of line of sight conditions above a threshold can be considered determining a first set 144 of time delay values 138 having an associated probability of line of sight conditions above a threshold.

In some examples, determining a first set 144 of line of sight time delay values 142 having an associated probability of line of sight conditions above a threshold comprises comparing the at least one metric 140 to at least one threshold value.

Comparing the at least one metric 140 to at least one threshold value can be done in any suitable way. For example, comparing the at least one metric 140 to the at least one threshold value can comprise determining if the at least one metric 140 is greater than, greater than or equal to, less than, or less than or equal to the at least one threshold value.

In examples, the at least one threshold value can be determined in any suitable way. For example, determining the at least one threshold value can comprise receiving the at least one threshold value. In examples, the at least one threshold value can be received at the terminal node 110 from the location server 112.

Any suitable threshold(s) determined in any suitable way can be used. In examples where the at least one metric 140 is determined as a step function, see for example Eqn 1, the threshold can be 0.5.

In examples where the at least one metric is determined as a probability, the threshold can be in the range 40% to 60% and/or in the range 45% to 55%. In some examples, the threshold can be or can be approximately 50%.

In some examples the threshold can be a predetermined value selected from one or more predetermined values. For example, the threshold can be retrieved from memory 134.

In examples the threshold can be determined based, at least in part, on one or more factors. Any suitable factors can be used, for example, number of access nodes 120 available to the terminal node 110 and/or requested accuracy of position/location estimate and/or historical line of sight information and so on.

In the example of table 1, where the determination is greater than or equal to a threshold value of 0.5, neither gNB 1 or gNB 2 would be in the first set 144 as both gNBs have $P_{LOS}$ values of 0, at both T1 and T2.

At block 208 the method comprises determining, based, at least in part, on the at least one metric 140, a second set 146 of time delay values 138 having an associated probability of line of sight conditions below the threshold.

In some examples, determining a second set 146 of time delay values 138 having an associated probability of line of sight conditions below the threshold can be considered determining a second set 146 of line of sight time delay values 142 having an associated probability of line of sight conditions below the threshold.

Any suitable method for determining, based, at least in part, on the at least one metric 140, a second set 146 of time delay values 138 having an associated probability of line of sight conditions below the threshold can be used.

In examples, determining the second set 146 of time delay values 138 comprises comparing the at least one metric 140 to the at least one threshold as described in relation to block 206, but in the opposite sense.

For example, if determining the first set 144 comprises determining associated metric(s) 140 greater than or equal to the threshold, then determining the second set 146 would comprise determining metric(s) 140 less than the threshold and so on.

In some examples, determining the second set 146 of time delay values 138 comprises determining the time delay values 138 not in the first set 144.

Accordingly, in some examples blocks 206 and 208 of method 200 can be combined into a single block or action comprising comparing the at least one metric 140 associated with the determined time delay values 138 for the access nodes 120 with the threshold.

In examples it can be considered that the time delay values 138 and/or the line of sight time delay values 142 for the access nodes 120 are grouped into the first set 144 having good or high probability or confidence of line of sight conditions and the second set 146 having bad or low probability or confidence of line of sight conditions.

At block 210 the method 200 comprises determining a position estimate 148 of the terminal node 110 based, at least in part, on the first set 144 of line of sight time delay values 142.

In examples, determining a position estimate 148 can be considered determining a location estimate 148.

Any suitable method for determining a position estimate 148 of the terminal node 110, based, at least in part, on the first set 144 of line of sight time delay values 142 can be used.

In examples, determining a position estimate 148 of the terminal node 110 comprises using an observed time difference of arrival method, based, at least in part, on the first set of line of sight time delay values 142.

At block 212 the method 200 comprises determining, based, at least in part, on the position estimate 148 of the terminal node 110, at least one line of sight time delay value 142 of the second set 146.

In some examples, the time delay values 138 of the second set 146 have determined line of sight time delay values 142, but with low associated probability or confidence of line of sight conditions and/or correct identification of line of sight time delay value 142.

Accordingly, in examples, determining at least one line of sight time delay value 142 of the second set 146 can be considered and/or comprise determining at least one updated or new line of sight time delay value 142 of the second set 146.

In some examples, determining at least one light of sight time delay value 142 of the second set 146 can be considered and/or comprise confirming at least one line of sight time delay value 142 of the second set 146.

Any suitable method for determining, based, at least in part, on the position estimate 148 of the terminal node 110, at least one line of sight time delay value 142 of the second set 146 can be used.

In examples, determining at least one line of sight time delay value 142 of the second set 146 comprises comparing distances 152 from the access nodes 120 represented by one or more time delay values 138 of the second set 146 with the position estimate 148 of the terminal node 110. See, for example, FIGS. 6 and 7.

The comparison can be made for one or more of the time delay values 138 of the second set 146. In some examples, the comparison can be made for the time delay values 138 in list Lc.

Comparing distances 152 from the access nodes 120 represented by time delay values 138 of the second set 146 with the position estimate 148 can be done in any suitable way.

In some examples, comparing distances 152 from the access nodes 120 represented by time delay values 138 in the second set 146 with the position estimate 148 of the terminal node 110 comprises determining a distance 152 between the position estimate 148 of the terminal node 110 and a colinear point 154 on a circle 156 or hyperbola described by one or more of the time delay values 138 of the second set 146. See for example, FIG. 6.

For example, a Euclidean or Manhattan distance 152 between the position estimate 148 of the terminal node 110 and a colinear point 154 on a circle 156 or hyperbola described by one or more of the time delay values 138 can be used. However, any suitable distance measurement or metric can be used.

In examples the line of sight time delay value 142 for an access node 120 of the second set 146 is determined as the time delay value 138 having the smallest determined distance 152 for that access node 120.

In some examples the line of sight time delay value 142, or time of arrival, can be defined as:

$$ToA_{S2} = \arg\min_{ToA \in Lc} \{d(A, B(t1)), d(A, C(t2))\} \quad \text{Eqn 2}$$

Where:
d(A,B(t1)) is the distance between the position estimate 148 of the terminal node 110 (A) and the colinear point 154 on a circle 156 represented by t1 (B); and
d(A,B(t2)) is the distance between the position estimate 148 of the terminal node 110 (A) and the colinear point 154 on a circle 156 represented by t2 (B).

In the example of eqn 2, two time delay values 138 (t1 and t2) are considered. However, any suitable number of time delay values 138 for an access node 120 can be considered.

At block 214 the method 200 comprises determining a new estimate of the position of the terminal node 110 based, at least in part, on the at least one determined line of sight time delay value 142 of the second set 146.

Any suitable method for determining a new estimate of the position of the terminal node 110 based, at least in part, on the at least one determined line of sight time delay value 142 of the second set 146 can be used.

In some examples, determining a new estimate of the position of the terminal node 110 comprises updating the position estimate of the terminal node 110 based, at least in part, on the at least one determined line of sight time delay value 142 of the second set 146.

Updating the position of the terminal node 110 based, at least in part, on the at least one determined line of sight time delay value 142 of the second set 146 can be done in any suitable way.

In some examples, updating the position estimate of the terminal node 110 comprises recalculating the position of the terminal node 110 using the line of sight time delay values 142 of the first set 144 and the line of sight time delay value(s) 142 of the second set 146 determined at block 212.

For example, updating the position estimate of the terminal node 110 can comprise using an observed time difference of arrival method, based, at least in part, on the first set of line of sight time delay values 142 and the line of sight time delay value(s) 142 of the second set 146 determined at block 212.

In some examples, updating the position estimate of the terminal node 110 comprises refining and/or altering and/or changing and/or amending and/or moving the position estimate of the terminal node 100 based, at least in part, on the line of sight time delay value(s) 142 of the second set 146 determined at block 212.

For example, a second position estimate of the terminal node 110 can be determined based, at least in part, on the line of sight time delay value(s) 142 of the second set 146 determined at block 212 and the new estimate of the position of the terminal node 110 determined based, at least in part, on the position estimate and second position estimate.

In examples, determining a second position estimate of the terminal node 110 comprises using an observed time difference of arrival method, based, at least in part, on the line of sight time delay value(s) 142 of the second set 146 determined at block 212.

In some examples, the new position of the terminal node 110 is defined as the midpoint of the segment defined by the position estimate 148 of the terminal node 110 and the second position estimate of the terminal node 110.

A technical advantage provided by the method 200 is an improvement in accuracy in determination of a position/location of a terminal node 110, such as user equipment (UE) 164.

In examples, the technical benefit is provided by using an location estimate of the terminal, derived from line of sight time delay values 142 for access nodes 120 having high probability or confidence of line of sight conditions, to determine one or more line of sight time delay values 142 from multipath data for other access nodes 120 having, initially, lower probability or confidence of line of sight conditions.

This provides, for example, mitigation of errors in the position estimate of a terminal node 110 arising from incorrect identification of a NLOS time delay value 138 as the LOS time delay value 142 or time of arrival.

At block 216 the method 200 comprises causing storage of, at least, the at least one metric 140 for the plurality of access nodes 120 and a position of the terminal node 110.

For example, the at least one metric 140 and the new estimate of the location of the terminal node 110, determined at block 214, can be stored in memory 134.

In some examples, further information can also be stored. For example, one or more of the power delay profile metrics.

This provides technical advantages. For example, it provides for a terminal node 110, such as a UE 164, and/or a server 112, such as a location server 112, to maintain channel tracking information which can be used to improve future determinations of the at least one metric 140. This therefore provides, for example, a more accurate and/or efficient position determination over time. See, for example, block 204.

Additionally, or alternatively an LOS map can be built, for example by a location server 112 and provided to one or more serving access nodes 120 for resource allocation purposes, more dynamic MCS tuning and so on.

A technical advantage provided is also therefore efficient resource allocation in a network 100 for example.

In some examples, the method 200 comprises determining positions of the plurality of access nodes 120.

Any suitable method for determining the positions of the plurality of access nodes 120 can be used.

For example, determining the positions of the plurality of access nodes 120 can comprise receiving the positions of the plurality of access nodes 120 and/or retrieving the positions of the plurality of access nodes 120 from memory 134.

In examples, determining the positions of the plurality of access nodes 120 is performed as part of block 212.

Consequently, FIG. 2 illustrates a method comprising:
determining, for a terminal node 110, at least one time delay value 138 for a plurality of access nodes 120;
determining at least one metric 140 for the access nodes 120, the at least one metric 140 indicative of probability of line of sight conditions between the terminal node 110 and the access nodes 120;
determining, based, at least in part, on the at least one metric 140, a first set 144 of line of sight time delay values 142 having an associated probability of line of sight conditions above a threshold;
determining, based, at least in part, on the at least one metric 140, a second set 146 of time delay values 138 having an associated probability of line of sight conditions below the threshold;
determining a position estimate 148 of the terminal node 110 based, at least in part, on the first set 144 of line of sight time delay values 142;
determining, based at least in part on the position estimate 148 of the terminal node 110, at least one line of sight time delay value 142 of the second set 146; and
determining a new estimate of the position of the terminal node 110 based, at least in part, on the at least one determined line of sight time delay value 142 of the second set 146.

Figure 3:
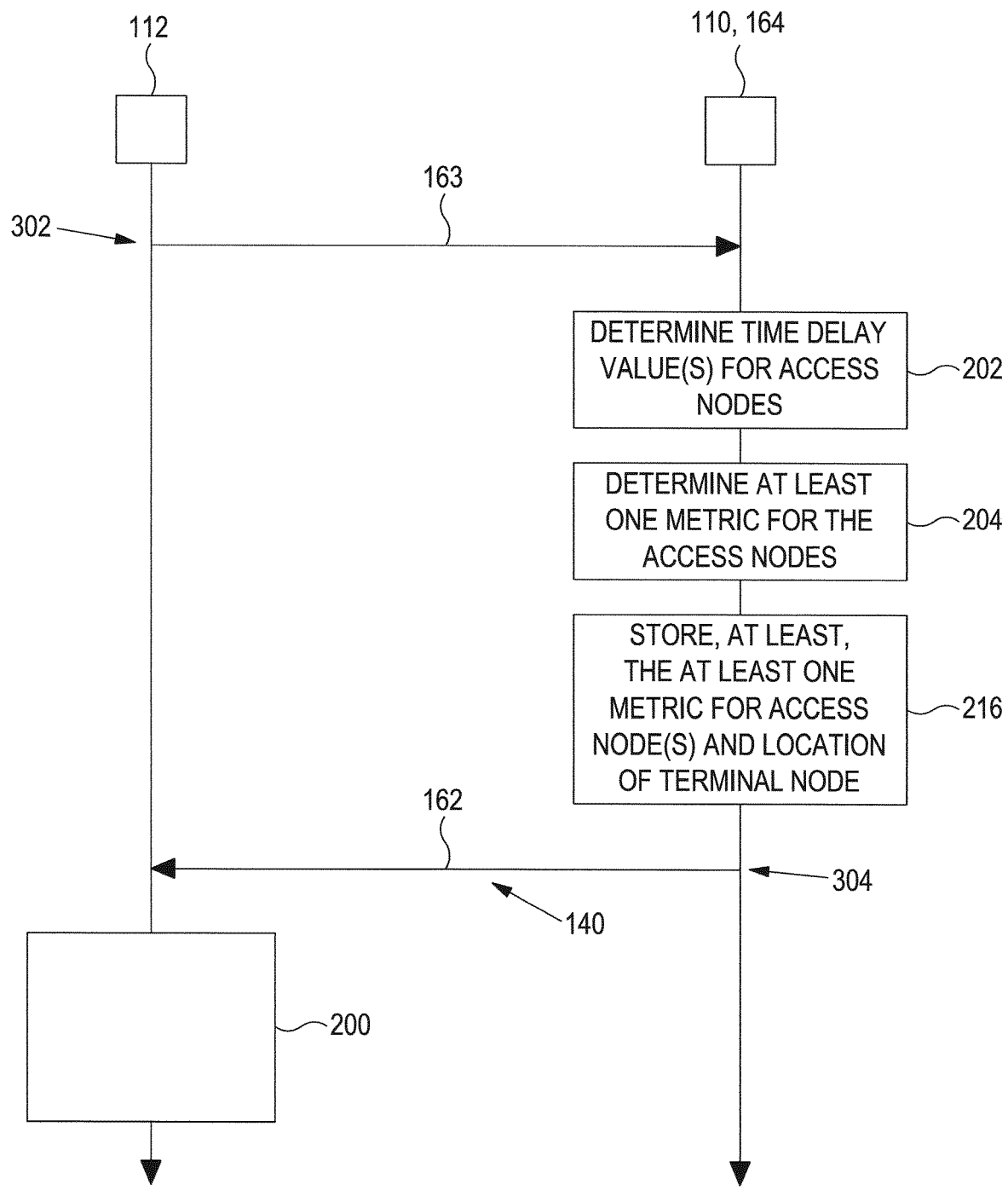
FIG. 3 shows another example of the subject matter described herein.

FIG. 3 illustrates an example of position estimation of a terminal node 110.

FIG. 3 can also be considered to disclose a method 300.

In the example of FIG. 3 a plurality of apparatuses communicate across a network. In examples, any suitable form of communication in any suitable network setup can be used. For example, the network 100 of FIG. 1 can be used.

In the illustrated example, a terminal node 110 is communicating with a server 112. In the example of FIG. 3 the terminal node 110 is user equipment (UE) 164 and the server is a location server 112.

At block 302, at least one signal 163 is transmitted from the location server 112 to the UE 164.

As FIG. 3 illustrates one or more actions of transmission of one or more signals between the location server 112 and the UE 164 FIG. 3 also illustrates the corresponding transmitting/causing transmitting feature.

Similarly, for any transmitting/causing transmitting feature FIG. 3 also illustrates the corresponding receiving action.

For example, block 302 therefore also illustrates receiving at least one signal 163 from the location server 112.

In the example of FIG. 3, the at least one signal 163 comprises information indicative of a request for the terminal node 110 to respond with, at least, one or more power delay profile metrics for access nodes 120 contactable by the terminal node and at least one metric 140 indicative of probability of line of sight conditions between the terminal node 110 and the access nodes 120.

In examples, the at least one metric 140 and/or the one or more power delay profile metrics can be as described in relation to block 204 of FIG. 2.

Any suitable information indicative of a request for the terminal node 110 to respond with the information can be used.

For example, the at least one signal 163 can comprise one or more flags indicating which information the terminal node 110 should respond with. For example, the at least one signal can comprise one or more flags to indicate which, if any, of the power delay profile metrics the terminal node 110 should respond with.

Additionally, or alternatively the at least one signal 163 can comprise the power threshold for use in determining the list of time delay values Lc. See, for example, block 204 of FIG. 2.

Additionally, or alternatively the at least one signal 163 can comprise the threshold value for use in determining the first and second sets 144, 146 of time delay values 142, 138. See, for example, blocks 206 and 208 of FIG. 2.

In examples, the one or more signals 163 comprises information indicative of a request for the terminal node 110 to respond with one or more time delay values 138 for the plurality of access nodes 120.

Any suitable information indicative of the request can be used.

In response to receiving the at least one signal 163, the terminal node 110, which in the example of FIG. 3 is a UE 164, determines the requested information.

In the example of FIG. 3 the UE 164 determines at least one time delay value 138 for the plurality of access nodes 120. This can be as described in relation to block 202 of FIG. 2 and is therefore is indicated as 202 in FIG. 3.

In the example of FIG. 3 the UE 164 also determines the at least one metric 140 and requested power delay profile metrics for the plurality of access nodes 120. This can be as described in relation to block 204 of FIG. 2 and therefore is indicated as 204 in FIG. 3.

In the example of FIG. 3 the UE also stores the at least one metric 140 for the plurality of access nodes 216, for future use. This can be as described in relation to block 216 of FIG. 2 and therefore is illustrated as 216 in FIG. 3.

At block 304 at least one signal 162 is transmitted from the terminal node 110 to the server 112 to provide the requested at least one metric 140 and one or more power delay profile metrics to the server 112.

In the example of FIG. 3 the one or more time delay values 138 are provided in the at least one signal 162.

FIG. 3 therefore illustrates transmitting, from a terminal node, at least one signal 162 to a server 112, the at least one signal 162 comprising information indicative of one or more power delay profile metrics for access nodes 120 contactable by the terminal node 110 and at least one metric 140 indicative of probability of line of sight conditions between the terminal node 110 and the access nodes 120.

Any suitable information indicative of the power delay profile metrics and at least one metric 140 can be used. For example, the values determined for the metrics can be provided in the at least one signal 162.

In examples, the most recent entry in the data structure illustrated in table 1 is provided in the at least one signal 162.

In the example of FIG. 3 the location server 112 then performs the method 200 of FIG. 2 based, at least in part, on the information received from the terminal node 110 in the at least one signal 162 to determine a position/location estimate of the UE 164.

Accordingly, in the example of FIG. 3, determining at least one time delay value 138 (block 202 of method 200) and determining at least one metric 140 (block 204 of method 200) comprises receiving one or more signals 162 from the terminal node 110.

In examples, the location server 112 can refine and/or correct the at least one metric 140 received for the access nodes 120 using topology information and/or historical information, for example past metric(s) 140 reported by different terminal nodes 110 located in substantially the same area.

Although in the example of FIG. 3 actions are performed at the terminal node 110 it is to be understood that the method 200 is performed at the server 112 based, at least in part, on information received from the terminal node 110.

In examples, transmitting at least one signal can comprise transmitting at least one message.

In some examples the example of FIG. 3 can comprise transmitting/receiving one or more additional signals (not illustrated) between the server 112 and the terminal node 110.

For example, one or more additional signals can be transmitted between the server 112 and the terminal node 110 to determine the capabilities of the terminal node 110 and/or provide additional information, such as access node identifications and/or locations, to the terminal node 110.

The method 300 illustrated in the example of FIG. 3 can be considered UE assisted positioning. In this example the location server 112 determines the position estimate based, at least in part, on information provided by the UE 164.

In other examples, the positioning can be UE based. See, for example, FIG. 4.

Figure 4:
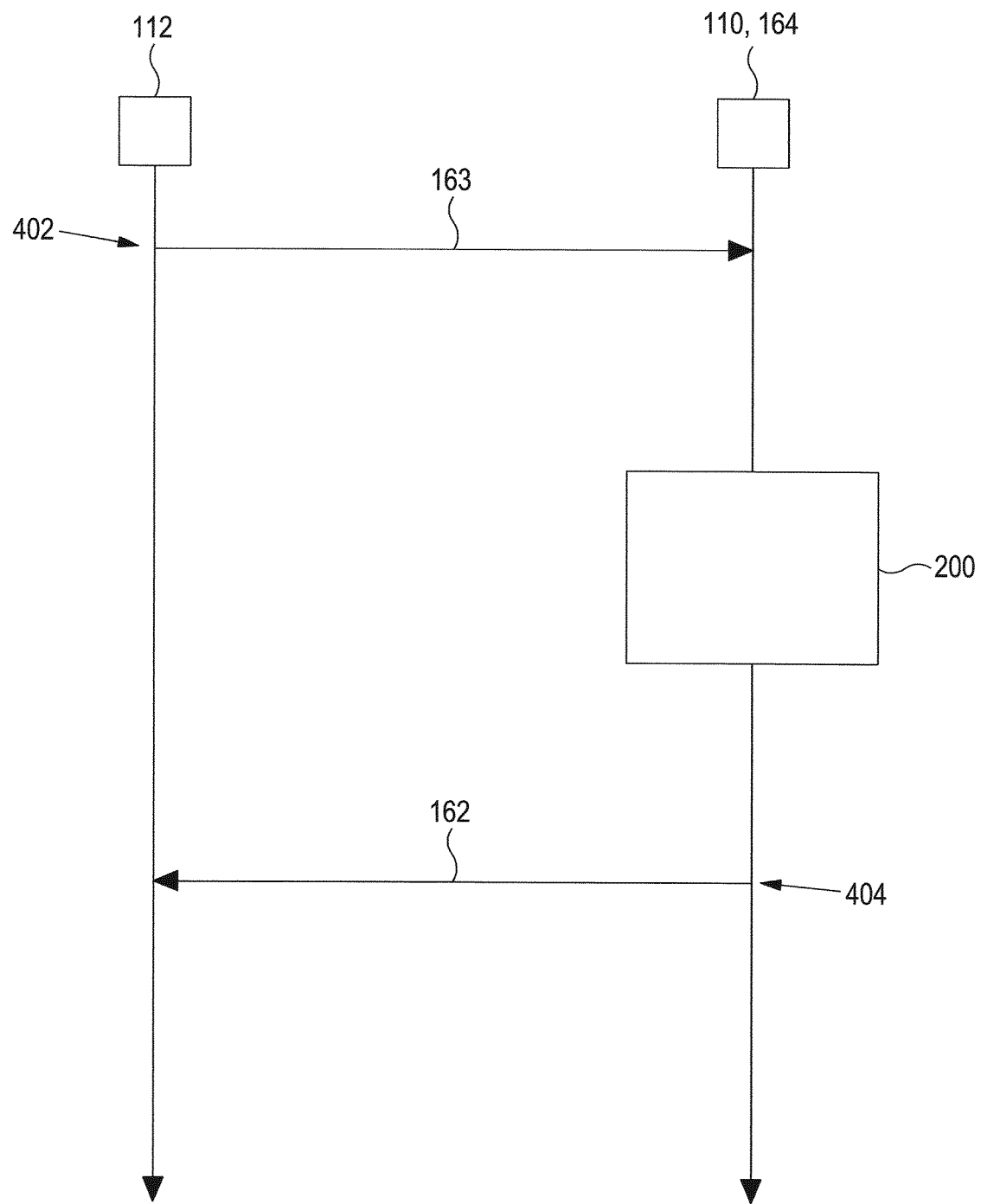
FIG. 4 shows another example of the subject matter described herein.

FIG. 4 illustrates an example of position estimation of a terminal node 110.

FIG. 4 can also be considered to disclose a method 400.

The example of FIG. 4 is similar to the example illustrated in FIG. 3 and also illustrates a terminal node 110 communicating with a server 112. In the example of FIG. 4 the terminal node 110 is user equipment (UE) 164 and the server 112 is a location server 112.

At block 402, at least one signal 163 is transmitted from the location server 112 to the UE 164. In examples, the at least one signal 163 can be as described in relation to FIG. 3.

In some examples, the at least one signal 163 in FIG. 4 can be different and comprises information indicative of a request for the terminal node 110 to respond with an estimate of the position/location of the terminal node 110. In some examples the at least one signal 163 of FIG. 4 can be considered an activation signal.

In response to receiving the at least one signal 163 the terminal node 110, which in the illustrated example is a UE 164, performs the method 200 of FIG. 2 to determine a position/location estimate of the terminal node 110. This is illustrated by the block labelled 200 in the example of FIG. 4.

Accordingly, in the example of FIG. 4, block 202 of method 200 comprises receiving one or more signals from the plurality of access nodes 120.

At block 404, at least one signal 162 is transmitted from the terminal node 110 to the server 112.

In examples the at least one signal 162 can be as described in relation to FIG. 3.

In some examples, the at least one signal 162 in the example of FIG. 4 is different and comprises the position/location estimate of the terminal node 110.

In some examples the example of FIG. 4 can comprise transmitting/receiving one or more additional signals (not illustrated) between the server 112 and the terminal node 110.

For example, one or more additional signals can be transmitted between the server 112 and the terminal node 110 to determine the capabilities of the terminal node 110 and/or provide additional information, such as access node identifications and/or locations, to the terminal node 110.

The method 400 illustrated in the example of FIG. 4 can be considered UE based positioning. In this example the UE 164 determines the position estimate and provides it to the location server 112.

Figure 5:
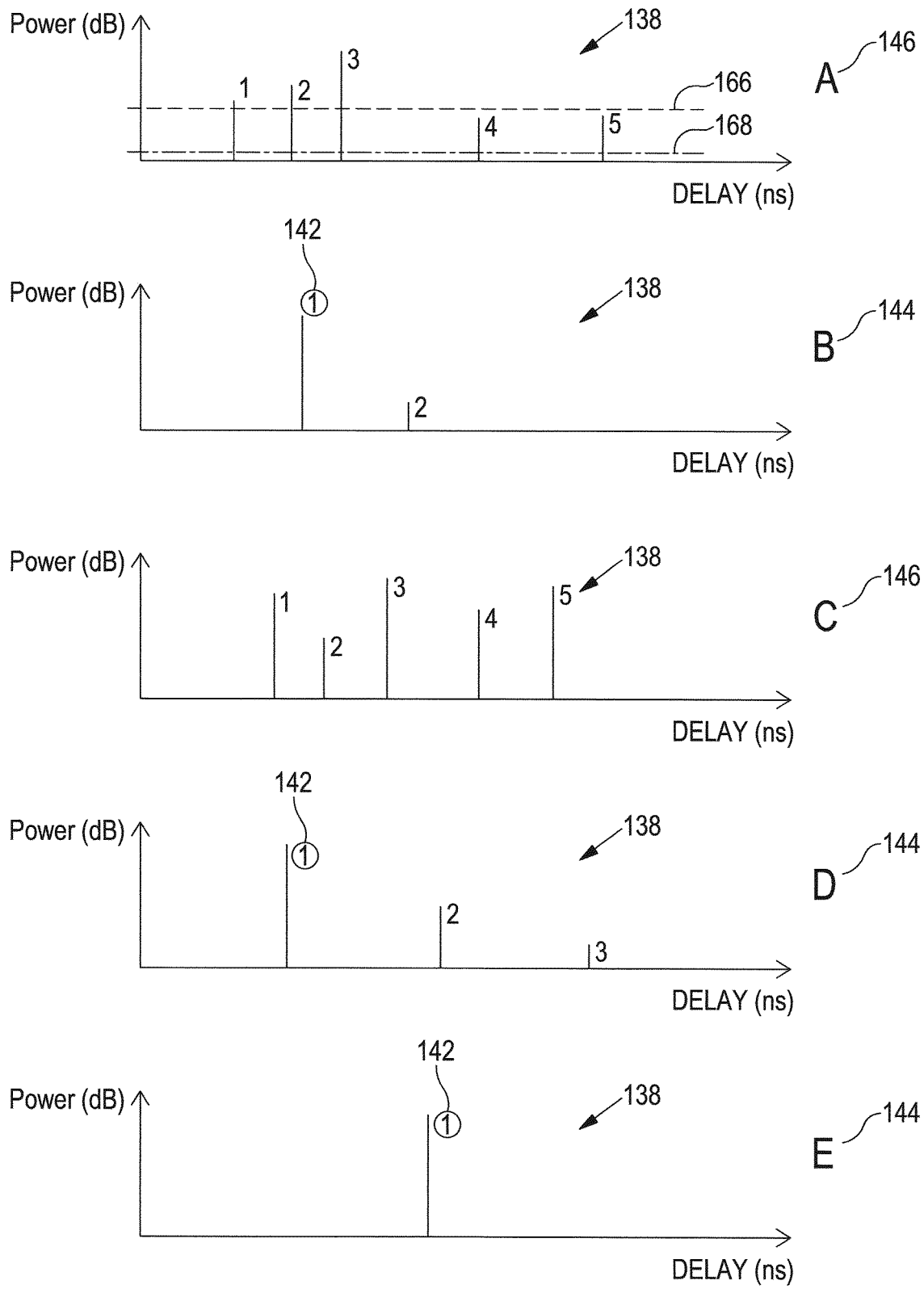
FIG. 5 shows another example of the subject matter described herein.

FIG. 5 illustrates examples of power delay profiles for a plurality of access nodes 120.

In the example of FIG. 5 the power delay profiles are determined by a terminal node 110, such as a UE 164.

In FIG. 5 power delay profiles for five access nodes 120 are shown. In the illustrated example the power delay profiles are labelled A to E.

The power delay profiles show a plurality of time delay values 138 for access nodes 120-A to E. In the illustrated example, the power delay profiles have been determined by cross-correlating received positioning reference signals with locally generated positioning reference signal sequences.

It can be seen in FIG. 5 that power delay profiles A to D comprise a plurality of time delay values 138. Power delay profiles A to D therefore comprise multipath information.

In the example of FIG. 5, line of sight time delay values 142 with an associated probability of line of sight conditions above a threshold have been determined for profiles B, D and E. The determination can be as described in relation to block 208 of FIG. 2.

Accordingly, in the example of FIG. 5, the line of sight time delay values 142 of profiles B, D and E are determined to be in the first set 144.

However, the time delay values 138 of profiles A and C are determined to have an associated probability of line of sight conditions below the threshold and are therefore determined to be in the second set 146.

In profile A of FIG. 5 the threshold used in determination of list Lc is shown as dashed line 166 and the threshold used in determination of channel sparsity is shown as dot-dashed line 168. See, for example, block 204 of FIG. 2.

In examples, a line of sight time delay value 142 can be determined for profiles A and C, however this is not marked in FIG. 5 as it is determined that there is insufficient probability or confidence that the correct line of sight time delay value 142 for profiles A and C has been determined.

For example, the time delay values 138 having the highest power can initially be determined as the line of sight time delay values 142 for profiles A and C. This is the time delay value labelled '3' for both profile A and profile C.

In the example of FIG. 5 a position estimate 148 of the terminal node 110 is determined based, at least in part, on the line of sight time delay values 142 in the first set 144. That is, the line of sight time delay values 142 of profiles B, D and E. This can be as described in relation to block 210 of FIG. 2.

As described in relation to FIG. 2, the position estimate 148 can be used to improve the determination of the line of sight time delay value 142 for profiles A and D. See, for example, FIGS. 6 and 7.

FIG. 6 illustrates an example scenario. FIG. 6 illustrates an example of determining a line of sight time delay value 138 based, at least in part on the position estimate 148 of the terminal node 110.

The example of FIG. 6 corresponds to profile A of FIG. 5.

In the example of FIG. 6, circles are drawn illustrating circles described by the first and second time delay values 138, labelled '1' and '2' in FIG. 5, and the positions of the respective access nodes 120.

In the illustrated example, these can be considered the delays present in list Lc for profile A.

Also illustrated in FIG. 6 is the position estimate 148 relative to the positions of the access nodes 120.

In FIG. 6, distances 152 between the position estimate 148 and colinear points on the circles are also shown.

It can be seen that the distance 152 for the second time delay value 138 is less than the distance 152 for the first time delay value 138.

Therefore, in this example, the second time delay value 138 of profile A is determined to be the line of sight time delay value 142.

This is illustrated in the example of FIG. 7 which shows the power delay profile labelled 'A' with the determined line of sight time delay value 142 indicated.

In examples a similar process could be followed for profile C of FIG. 5.

Accordingly, a new position estimate for the terminal node 110 can be determined based on the line of sight time delay values 142 for some or all profiles A to E, providing improved accuracy in the position estimate for the terminal node by use of multipath information.

FIG. 8A illustrates an example of an apparatus 130, the apparatus may be a controller of an apparatus or device such as terminal node 110, for example UE 164, or server 112, for example location server 112.

Implementation of apparatus 130 may be as controller circuitry. The apparatus 130 may be implemented in hardware alone, have certain aspects in software including firmware alone or can be a combination of hardware and software (including firmware).

As illustrated in FIG. 8A the apparatus 130 may be implemented using instructions that enable hardware functionality, for example, by using executable instructions of a computer program 136 in a general-purpose or special-purpose processor 132 that may be stored on a computer readable storage medium (disk, memory etc) to be executed by such a processor 132.

The processor 132 is configured to read from and write to the memory 134. The processor 132 may also comprise an output interface via which data and/or commands are output by the processor 132 and an input interface via which data and/or commands are input to the processor 132.

The memory 134 stores a computer program 136 comprising computer program instructions (computer program code) that controls the operation of the apparatus 130 when loaded into the processor 132. The computer program instructions, of the computer program 136, provide the logic and routines that enables the apparatus to perform the methods illustrated in FIGS. 2, 3 and/or 4. The processor 132 by reading the memory 134 is able to load and execute the computer program 136.

The apparatus 130 therefore comprises:
at least one processor 132; and
at least one memory 134 including computer program code the at least one memory 134 and the computer program code configured to, with the at least one processor 132, cause the apparatus 130 at least to perform:

determining, for a terminal node, at least one time delay value for a plurality of access nodes;

determining at least one metric for the access nodes, the at least one metric indicative of probability of line of sight conditions between the terminal node and the access nodes;

determining, based, at least in part, on the at least one metric, a first set of line of sight time delay values having an associated probability of line of sight conditions above a threshold;

determining, based, at least in part, on the at least one metric, a second set of time delay values having an associated probability of line of sight conditions below the threshold;

determining a position estimate of the terminal node based, at least in part, on the first set of line of sight time delay values;

determining, based at least in part on the position estimate of the terminal node, at least one line of sight time delay value of the second set; and determining a new estimate of the position of the terminal node based, at least in part, on the at least one determined line of sight time delay value of the second set.

As illustrated in FIG. 8A, the computer program 136 may arrive at the apparatus 130 via any suitable delivery mechanism 137. The delivery mechanism 137 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 136. The delivery mechanism may be a signal configured to reliably transfer the computer program 136. The apparatus 130 may propagate or transmit the computer program 136 as a computer data signal.

Computer program instructions for causing an apparatus to perform at least the following or for performing at least the following:

determining, for a terminal node, at least one time delay value for a plurality of access nodes;

determining at least one metric for the access nodes, the at least one metric indicative of probability of line of sight conditions between the terminal node and the access nodes;

determining, based, at least in part, on the at least one metric, a first set of line of sight time delay values having an associated probability of line of sight conditions above a threshold;

determining, based, at least in part, on the at least one metric, a second set of time delay values having an associated probability of line of sight conditions below the threshold;

determining a position estimate of the terminal node based, at least in part, on the first set of line of sight time delay values;

determining, based at least in part on the position estimate of the terminal node, at least one line of sight time delay value of the second set; and determining a new estimate of the position of the terminal node based, at least in part, on the at least one determined line of sight time delay value of the second set.

The computer program instructions may be comprised in a computer program, a non-transitory computer readable medium, a computer program product, a machine readable medium. In some but not necessarily all examples, the computer program instructions may be distributed over more than one computer program.

Although the memory 134 is illustrated as a single component/circuitry it may be implemented as one or more separate components/circuitry some or all of which may be integrated/removable and/or may provide permanent/semi-permanent/dynamic/cached storage.

In examples the memory 134 comprises a random access memory 170 and a read only memory 172. In examples the computer program 136 can be stored in the read only memory 172. See, for example, FIG. 8B In some examples the memory 134 can be split into random access memory 170 and read only memory 172.

Although the processor 132 is illustrated as a single component/circuitry it may be implemented as one or more separate components/circuitry some or all of which may be integrated/removable. The processor 132 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 2, 3 and/or 4 may represent steps in a method and/or sections of code in the computer program 136. The illustration of a particular order to the blocks does not necessarily imply that there is a required or preferred order for the blocks and the order and arrangement of the block may be varied. Furthermore, it may be possible for some blocks to be omitted. For example, block 216 of FIG. 2 may be omitted.

Where a structural feature has been described, it may be replaced by means for performing one or more of the functions of the structural feature whether that function or those functions are explicitly or implicitly described.

Thus, the apparatus can comprise means for:
determining, for a terminal node, at least one time delay value for a plurality of access nodes;
  determining at least one metric for the access nodes, the at least one metric indicative of probability of line of sight conditions between the terminal node and the access nodes;
  determining, based, at least in part, on the at least one metric, a first set of line of sight time delay values having an associated probability of line of sight conditions above a threshold;
determining, based, at least in part, on the at least one metric, a second set of time delay values having an associated probability of line of sight conditions below the threshold;
  determining a position estimate of the terminal node based, at least in part, on the first set of line of sight time delay values;
  determining, based at least in part on the position estimate of the terminal node, at least one line of sight time delay value of the second set; and
  determining a new estimate of the position of the terminal node based, at least in part, on the at least one determined line of sight time delay value of the second set.

The systems, apparatus, methods and computer programs may use machine learning which can include statistical learning. Machine learning is a field of computer science that gives computers the ability to learn without being explicitly programmed.

The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. A location server, comprising:
   at least one processor; and
   at least one memory including computer program code, the at least one memory and the computer program code configured to, with the at least one processor, cause the location server to perform:
   transmitting at least one signal to a terminal node, the at least one signal comprising a request for the terminal node to respond with, at least, one or more metrics for access nodes contactable by the terminal node that describe multipath channels between the terminal node and the access nodes and at least one metric indicative of probability of line of sight paths between the terminal node and the access nodes; and
   receiving, from the terminal node, at least the one or more metrics that describe multipath channels between the terminal node and the access nodes and the at least one metric indicative of probability of line of sight paths between the terminal node and the access nodes.

2. The location server as claimed in claim 1, wherein the one or more power delay profile metrics comprises at least one of: mean excess delay, root mean square delay spread, a list of time delay values that are less than a determined line of sight time delay value for an access node and within a predetermined amount from the maximum received power for that access node, and the number of multipath components above a predetermined power.

3. The location server as claimed in claim 1, wherein the at least one memory and the computer program code are further configured to, with the at least one processor, cause the location server to perform:
   receiving at least one signal from the terminal node, the at least one signal comprising the information indicative of the one or more power delay profile metrics for the access nodes contactable by the terminal node and the at least one metric indicative of probability of line of sight conditions between the terminal node and the access nodes.

4. The location server as claimed in claim 3, wherein the at least on signal is received in response to transmitting the at least one signal.

5. The location server as claimed in claim 1, wherein the at least one memory and the computer program code are further configured to, with the at least one processor, cause the location server to perform:
   determining, based at least in part on the information received from the terminal node on the at least one signal, position or location estimate of the terminal node.

6. The location server as claimed in claim 5, wherein the at least one memory and the computer program code are further configured to, with the at least one processor, cause the location server to perform:
   correcting the at least one metric using topology information and/or historical information reported by different terminal nodes located in substantially the same area.

7. The location server as claimed in claim 1, wherein the at least one metric represents line of sight probability.

8. A terminal node, comprising:
   at least one processor; and
   at least one memory including computer program code, the at least one memory and the computer program code configured to, with the at least one processor, cause the terminal node to perform:
   transmitting at least one signal to a server, the at least one signal comprising one or more metrics for access nodes contactable by the terminal node that describe multipath channels between the terminal node and the access nodes and at least one metric indicative of probability of line of sight paths between the terminal node and the access nodes; and
   transmitting to the server, at least the one or more metrics that describe multipath channels between the terminal node and the access nodes and the at least one metric indicative of probability of line of sight paths between the terminal node and the access nodes.

9. The terminal node as claimed in claim 8, wherein the one or more power delay profile metrics comprises at least one of: mean excess delay, root mean square delay spread, a list of time delay values that are less than a determined line of sight time delay value for an access node and within a predetermined amount from the maximum received power for that access node, and the number of multipath components above a predetermined power.

10. The terminal node as claimed in claim 8, wherein the at least one memory and the computer program code are further configured to, with the at least one processor, cause the terminal node to perform:
    receiving at least one signal from the server, the at least one signal comprising information indicative of a request for the terminal node to respond with, at least, the one or more power delay profile metrics for the access nodes contactable by the terminal node and the at least one metric indicative of probability of line of sight conditions between the terminal node and the access nodes.

11. The terminal node as claimed in claim 10, wherein the at least one memory and the computer program code are configured to, with the at least one processor, cause the terminal node to perform:
    in response to receiving the at least one signal, determining the one or more power delay profile metrics and the at least one metric indicative of probability of line of sight conditions between the terminal node and the access nodes.

12. The terminal node as claimed in claim 10, wherein the at least one signal is transmitted to provide the requested one or more power delay profile metrics and the at least one metric to the server.

13. The terminal node as claimed in claim 8, wherein the at least one metric represents line of sight probability.

14. A method, comprising:
    transmitting, by a location server, at least one signal to a terminal node, the at least one signal comprising a request for the terminal node to respond with, at least, one or more metrics for access nodes contactable by the terminal node that describe multipath channels between the terminal node and the access nodes and at least one metric indicative of probability of line of sight paths between the terminal node and the access nodes; and receiving, from the terminal node, at least the one or more metrics that describe multipath channels between the terminal node and the access nodes and the at least one metric indicative of probability of line of sight paths between the terminal node and the access nodes.

15. A method, comprising:

transmitting, by a terminal node, at least one signal to a server, the at least one signal comprising one or more metrics for access nodes contactable by the terminal node that describe multipath channels between the terminal node and the access nodes and at least one metric indicative of probability of line of sight paths between the terminal node and the access nodes; and transmitting to the server, at least the one or more metrics that describe multipath channels between the terminal node and the access nodes and the at least one metric indicative of probability of line of sight paths between the terminal node and the access nodes.

\* \* \* \* \*